Figure 1:
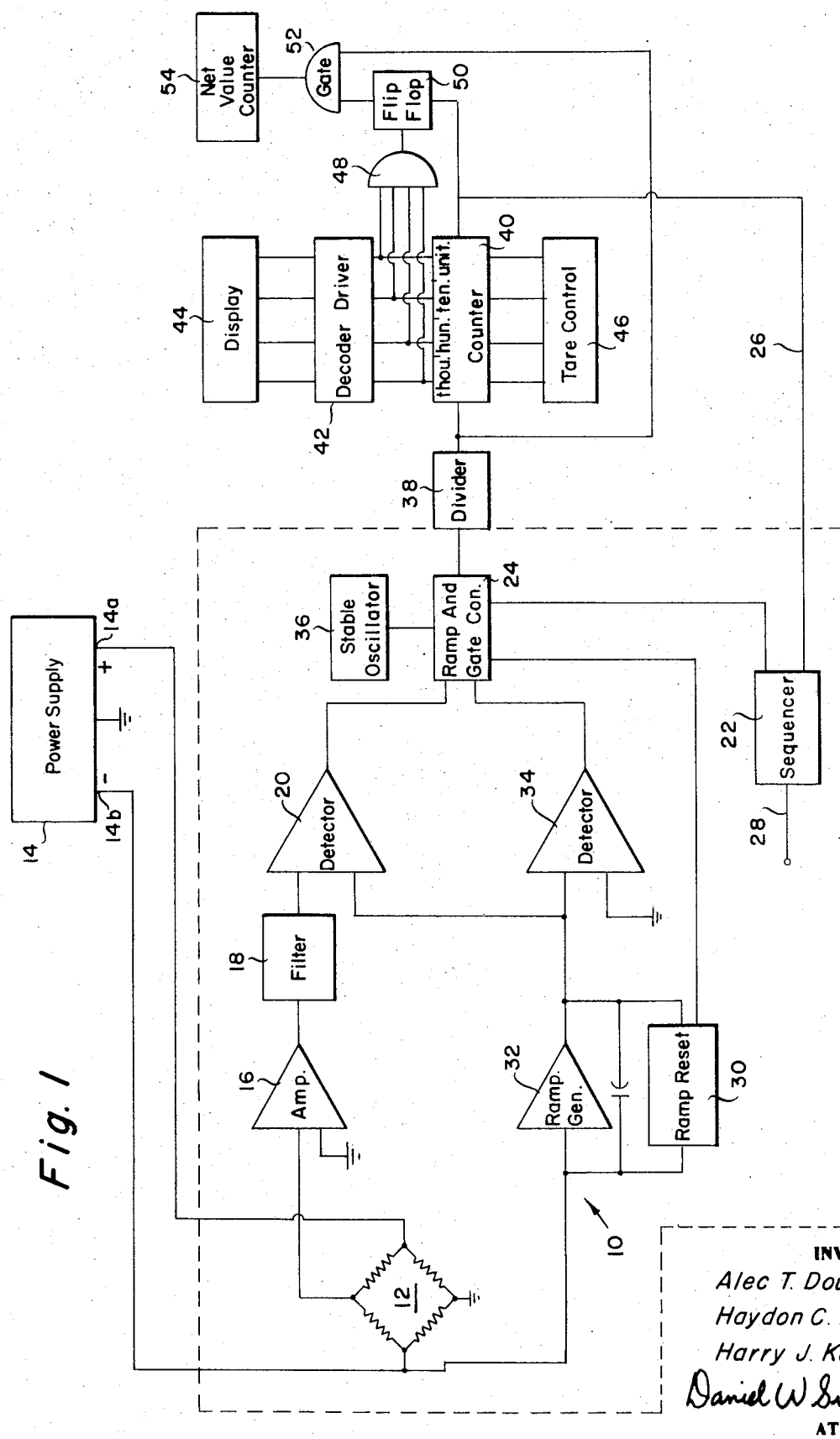

United States Patent [19]
Douglas et al.

[11] 3,728,626
[45] Apr. 17, 1973

[54] ELECTRONIC MEASURING SYSTEM

[75] Inventors: Alec T. Douglas; Haydon C. Thomas, both of St. Johnsbury; Harry J. Keen, Waterford, all of Vt.

[73] Assignee: Colt Industries Operating Corp., New York, N.Y.

[22] Filed: Mar. 25, 1971

[21] Appl. No.: 128,065

[52] U.S. Cl.................324/99 D, 177/211, 324/62 R
[51] Int. Cl..........................G01r 17/06, G01r 27/02
[58] Field of Search......................324/99, 99 D, 100, 324/62 R; 73/88.5, 141; 177/210, 211, 164

[56] References Cited

UNITED STATES PATENTS

| 3,434,343 | 3/1969 | Senour | 324/99 R |
| 3,564,406 | 2/1971 | Henderson et al. | 324/99 D |
| 3,565,194 | 2/1971 | Engle et al. | 177/164 X |

Primary Examiner—Rudolph V. Rolinec
Assistant Examiner—Ernest F. Karlsen
Attorney—Daniel W. Sixbey

[57] ABSTRACT

The electronic measuring system includes a transducer to develop an analog signal which is a function of a value to be measured, a reference signal generating unit, a first comparison unit to provide a start signal when a reference signal from the reference generating unit reaches a coincidence point with the system ground potential and a second comparison unit to provide a stop signal when the reference and analog signals reach a coincidence point. All of these units are powered from a single power source and referenced to ground potential. A counter system receives and registers pulses in the interval between the start and stop signals and includes a first counter which is preset below zero and a net counter which is activated to count pulses after the first counter reaches zero. A ramp reset circuit is provided to actively drive the reference signal from the reference generating unit to a quiescent state when the stop signal is provided.

18 Claims, 2 Drawing Figures

INVENTORS
Alec T. Douglas
Haydon C. Thomas
Harry J. Keen

Daniel W. Sibley
ATTORNEYS

ELECTRONIC MEASURING SYSTEM

BACKGROUND OF THE INVENTION

To meet an increased demand for accurate electronic measuring systems having a rapid response, voltage measuring and conversion units including analog to digital conversion systems employing a ramp voltage measuring technique have been developed. These units provide a digital indication which represents the magnitude of an unknown analog input voltage provided by a suitable condition responsive transducer. This is accomplished by comparing a locally generated ramp voltage having a constant voltage rise per unit time to the unknown analog input voltage while simultaneously gating pulses from a stable oscillator which may be counted in a counter and indicator system. When the ramp voltage rises to a value equal to the input analog voltage, pulse counting is discontinued so that the digital count registered by the counter and indicator system is determined by the time required for the ramp voltage to equal the input analog voltage.

A basic electronic measuring system employing ramp measuring techniques is disclosed in U.S. Pat. No. 3,160,811 to R. Ortiz Muniz et al. assigned to the assignee of the present invention. Although the measuring and conversion system of this patent operates effectively to provide a rapid measuring and conversion function, a problem may be encountered in attempting to obtain accurate sensing of coincidence between the ramp and analog signals. This is due to the fact that the counter units for registering the digital count are activated at the instant that the ramp voltage rise begins, and if the ramp voltage is produced by a ramp capacitor which experiences decay voltage variations and other non-linearities at the initial portion of the ramp curve, the comparison function is subjected to these initial non-linearities in the ramp voltage.

Also, if, at the instant the ramp voltage is initiated, the counters are also activated, it is possible that a runaway counter condition may occur. This results if the amplitide of the analog input signal is exactly equal to or less than the ramp voltage amplitude when the ramp voltage begins and the counters are activated so that no later coincidence occurs between the ramp and analog signals. Without this coincidence condition, no stop pulse is generated to terminate counter operation.

To eliminate the effect of small non-linearities which often occur in the initial portion of the ramp voltage curve and to rectify the runaway counter problem, improved measuring and conversion systems employing dual comparator units for separately generating the start and stop pulses for controlling counter operation have been developed. Such a system is illustrated in U.S. Pat. No. 3,258,764 to R. Otiz-Muniz et al. and assigned to the assignee of the present invention.

Although improved measuring circuits employing dual comparator systems which incorporate the advantages of high speed operation provided by improved electronic components have been effectively employed to eliminate the deficiencies of single comparator systems, these circuits still have a number of disadvantages. For example, the voltage measuring and conversion system employing dual comparators of the Muniz et al. patent requires the use of a plurality of different power supplies to provide offset voltages, transducer power, ramp generator power and power for various components in the electronic system. Not only does the use of a number of separate power supplies appreciably increase the cost of a measuring system, but also an output variation in any one of such power supplies may operate to destroy system accuracy.

It is a primary object of the present invention to provide a novel and improved electronic measuring unit which employs a novel ramp voltage comparator system and a single reference power supply for a measuring transducer, and a ramp generator.

Another object of the present invention is to provide a novel and improved electronic measuring unit which includes a novel ramp generator which varies a ramp reference signal in response to power supply variations to compensate for the effect of such variations on an analog input signal.

A further object of the present invention is to provide a novel and improved electronic measuring unit employing a dual comparator ramp reference system wherein the ground potential of a single power supply for the system is used as a comparator reference input.

Another object of the present invention is to provide a novel and improved electronic measuring unit wherein a ramp signal is initiated for a period prior to a comparison cycle to compensate for non linearities in the initial portion of the ramp curve.

A still further object of the present invention is to provide a novel and improved electronic measuring unit which incorporates a first counter system having a tare preset control and a second counter system operative upon the zeroing of said first counter system to provide a net count.

Figure 2:
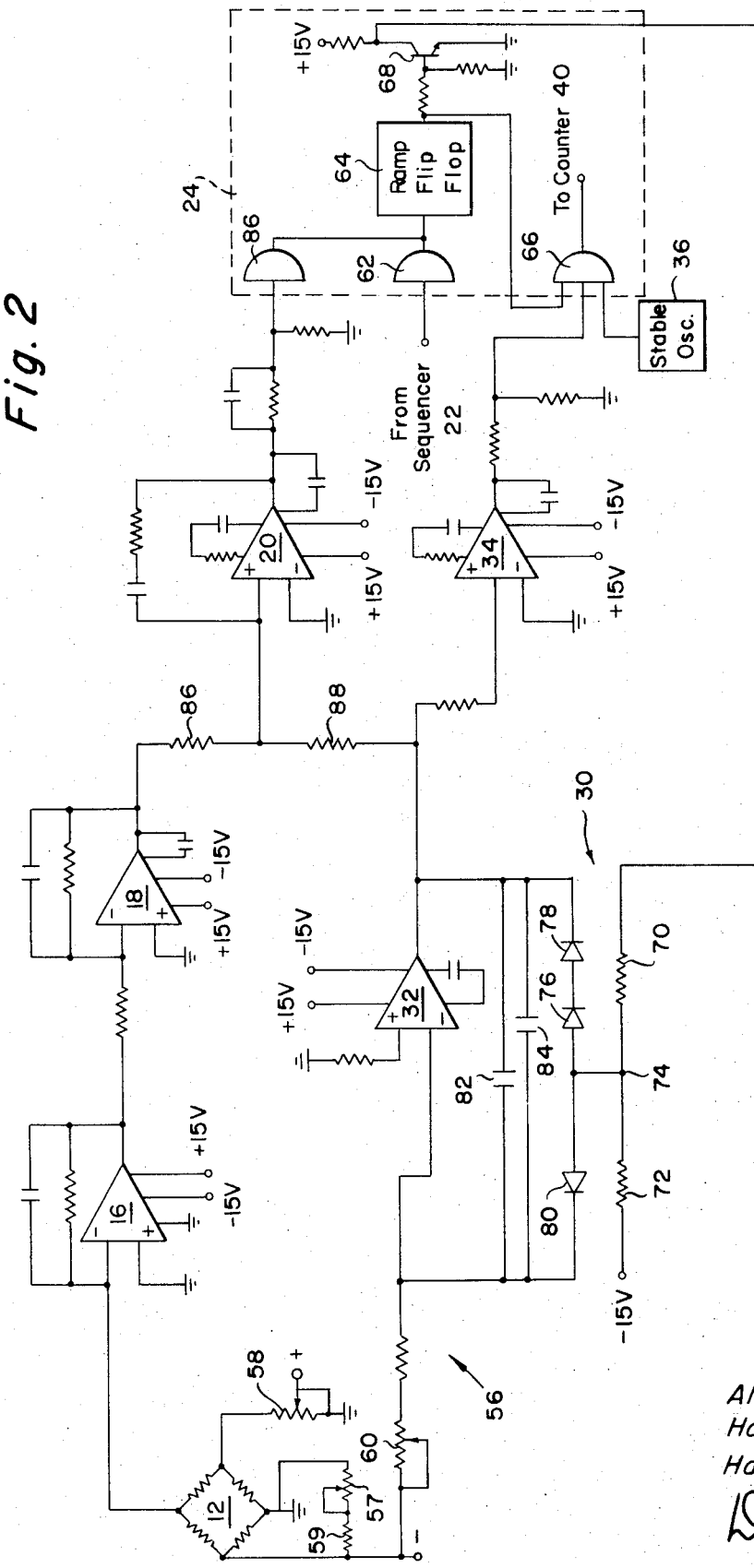

These and other objects of the present invention will become readily apparent upon considering the following specification taken in conjunction with the accompanying drawings in which:

FIG. 1 is a block diagram of the electronic measuring unit of the present invention; and FIG. 2 is a circuit diagram of the conversion system employed in the electronic measuring unit of FIG. 1.

For purposes of illustration, the electronic measuring unit of the present invention will be described as a force measuring or weighing system which employs a load cell transducer system and a tare control system for introducing a compensating tare setting into a counter system. It is emphasized, however, that numerous other transducers might be substituted for the load cell hereinafter referred to, and that this measuring unit may be adapted for numerous measuring applications not related to weighing or force measuring functions.

Basically, the present invention involves the use of a single power supply for an electronic measuring unit transducer and for a ramp generator in an electronic analog to digital measuring system. The ground potential for the system is employed as a comparator reference input and thus eliminates the numerous reference power supplies required for other measuring units. As only one reference power supply is employed, the system is self compensating when variations in the power supply output occur, for these variations affect all components equally. Thus a variation in the analog input signal from an input transducer is compensated for by a corresponding variation in a ramp reference signal utilized in the measurement of the analog signal, for both the input transducer and ramp generator are affected by the same power supply variations.

Referring now to FIG. 1, the electronic measuring unit of the present invention, indicated generally at 10, includes a transducer 12 which operates to convert a function to be measured into an electrical analog input signal. For weighing applications, the transducer 12 constitutes a conventional load cell in the form of a strain gage bridge which is attached to a weigh platform, not shown. An electrical power supply 14 is connected to the load cell in such a manner that the load cell renders the supply symmetrical about ground potential. Thus, with a D.C. power supply which provides a positive 15 volts and a negative 15 volts at terminals 14a and 14b respectively, the load cell may be set in a conventional manner by control potentiometers to have inputs of a positive and negative seven and one half volts. Of course other voltage values may be employed.

A load applied to the load cell 12 results in the production of an analog signal which is fed to a D.C. amplifier 16. An amplified output signal from the amplifier is filtered in a filter 18 to minimize the effects of weigh platform oscillations and induced noise signals, and is fed as a first input to an operational amplifier type detector 20.

A sequencer 22, which controls the operation of the electronic measuring unit 10, provides control signals to a ramp and gate control unit 24 and strobe signals on a strobe line 26. The sequencer may be initially activated by a start signal applied to an input 28, and once activated, will operate to provide the control signals necessary to program the electronic measuring unit 10 through a complete measuring operation. It must be recognized that during a single measuring operation, the measuring unit may complete a single measuring cycle, or a plurality of measuring cycles may occur to provide an average indication. Sequencing units capable of providing such programmed operation have been previously employed in known measuring units.

To initiate a measuring cycle, the sequencer 22 will provide an enabling signal to the ramp and gate control unit 24 which in turn causes a ramp reset unit 30 to permit an integrator ramp generator 32 to charge linearly to a positive voltage from an initial negative voltage level. The linear ramp signal developed by the ramp generator is fed to an input of the detector 20 and also to a first input of an operational amplifier type detector 34. A second input to the detector 34 is referenced to ground, so that as the ramp signal increases from a negative voltage to a zero point with this ground reference, the detector changes state and provides a start signal to the ramp and gate control unit 24. It should be noted that the ramp signal increased from an initial negative level to zero before the start signal was produced, thus causing initial nonlinearities in the ramp signal to occur before initiation of the start signal.

The start signal from the detector 34 enables a pulse gate in the ramp and gate control unit 24 to pass pulses from a stable oscillator 36 to an output circuit, which may constitute a divider 38. This will occur until the ramp signal reaches a voltage level which is equal but opposite in polarity to that of the analog signal at the first input of the detector 20. At this point when the algebraic sum of the ramp and analog signals is zero, the detector 20 will change state and provide a stop signal to close the pulse gate in the ramp and gate control unit 24 to terminate the provision of output pulses generated by the stable oscillator 36. Also, the stop pulse causes the ramp and gate control unit to initiate a ramp reset operation by the ramp reset unit 30 which operates to rapidly drive the ramp signal back to the initial negative starting level.

The ramp signal is actively driven from the ramp generator 32 by the ramp reset unit 30 in order to rapidly clear the ramp generator for a new measuring cycle. With many conventional electronic measuring units, the ramp signal is permitted to decay naturally, and the discharge time for ramp generator components is excessive if rapid recycling is desired. Generally, it is preferable for the sequencer 22 to trigger a plurality of ramp and measuring cycles for each measurement taken by the electronic measuring unit 10, but the total elapsed time of each complete measuring operation must not be excessive. Therefore, a rapid recovery of the ramp generator is imperative.

The pulses from the oscillator 36 pass from the ramp and gate control unit 24 through the divider 38, if such is provided, to a counter 40 which registers the pulse count occurring between the start and stop pulses from the detectors 20 and 34. This counter is a conventional decade counter used for measuring operations and includes, for illustrative purposes, a units, a tens, a hundreds and a thousands decade which provide a binary coded decimal (BCD) output to a decoder driver 42. The decoder driver converts the output from the counter into an activating input for a display device 44, or a similar output indicating device such as a printer, typewriter, adding machine, tape punch, card punch, or the like.

For many measuring applications, such as weighing operations, it is necessary to preset the counter 40 to compensate for conditions affecting the measurement. Where weighing is involved, the weight of various objects such as containers for material to be weighed must be subtracted from the total measured weight indication registered by the counter 40 during a measurement operation, and therefore a tare control unit 46 is provided to initially preset the counter below zero so as to compensate for this unwanted weight. A number of different tare control units for setting a compensating value into a decade BCD counter are known to the art. One such unit consists of a plurality of tare switches which are coded in BCD code with a modified nines complement, and this code fed to the inputs of the counter decades set the counter so that a number of pulses are registered before the counter reaches a zero setting.

The sequencer 22 strobes the counter 40 to strobe into the counter the value set in the tare control unit before a measurement is taken. With the counter set below zero, the number of pulses required to drive the counter to zero is unknown, and thus it is difficult to accumulate net weight values with this compensated counter system. For many weighing applications, such as in axle weighing, it is often necessary to rapidly accumulate a plurality of net weight indications.

The electronic measuring unit 10 is adapted to provide net weight or other net value indications by means of a multiple input gate 48 which has inputs connected to the decade outputs of the counter 40. For a BCD counter, there would normally be four gate inputs for each counter decade. When the pulses from the divider 38 drive all of the counter decades to zero, the gate 48 provides a control signal to change a flip flop 50 from a first to a second state. In the second state, the flip flop sends an enabling signal to a first input of an inhibit gate 52 which has a second input connected to the output of the divider 28. Upon receipt of the enabling signal, the inhibit gate passes pulses to a net value counter 54 which may be associated with a printer unit or other suitable indicator. This counter may be used to register a single net value or to accumulate a plurality of net values, and may be reset upon the occurrence of a printout by an associated printer or by other known resetting means.

The flip flop 50 is reset to the initial first state by the strobe signal on strobe line 26 which strobes the tare control value into the counter 40. By inhibiting the passage of pulses to the net value counter 54 until the counter 40 is driven to zero, a net value is registered in the net value counter for each group of pulses passed through the ramp and gate control unit 24.

In accordance with the present invention, it is necessary for all of the actual measuring components of the electronic measuring unit 10 such as the load cell or transducer 12 and integrator 32, to receive power from the single power supply 14 and conceivably the complete measuring unit could be powered by this power supply. These measuring components are included in a measuring assembly 56 enclosed by broken lines in FIG. 1.

The construction and operation of the measuring assembly 56 may be better understood by referring to the detailed circuit diagram of FIG. 2. Here, it will be noted that the power input to the load cell 12 from the power supply 14 may be adjusted by a span potentiometer 58. Also a zero potentiometer 57 and dead load resistor 59 are connected in series between the negative input from the power supply 14 and ground to eliminate the use of a conventional reference supply. Generally, a zero offset is provided to compensate for a load platform weight in a weighing system or for other input transducer variables, and this zero offset is conventionally provided by introducing an offset current from a separate power supply into the input amplifier 16 or the detector 20. This zero offset is effectively provided by the zero potentiometer and the dead load resistor, for the zero potentiometer may be adjusted to provide zero adjustment and dead load compensation at the bridge 12. If the load cell power supply 14 varies, the dead load offset provided by the potentiometer 57 and resistor 59 varies to compensate for the power supply variation. Therefore, if the power supply output increases, the dead load output from the transducer increases, for example the load output resulting from the weight of a weigh platform, but the dead load offset provided by the potentiometer 57 and the resistor 59 also increases to provide compensation.

Similarly, if the power supply voltage increases, the load cell supply increases and the amplitude of the analog signal to the detector 20 will increase. However, there will be a corresponding current increase to the integrator ramp generator 32, and the integrator ramp generator will charge at a faster rate, thus creating a steeper ramp signal. The elapsed time required for the ramp signal to reach a coincidence point with the increased analog signal will be substantially the same as the elapsed time which would occur if the power supply remained constant, for the increase in the ramp signal slope compensates for the increase in the analog signal. The reverse occurs when the power supply output decreases. Thus normal variations in the power supply output cancel out and do not affect the operation of the measuring assembly.

The integrator ramp generator 32 is connected by a span potentiometer 60 to the negative side of the power supply 14 and is referenced to ground. Adjustment of the span potentiometer varies the charging current of the integrator and thus the slope of the output ramp therefrom.

In prior measuring systems where separate biasing sources were provided for various components of the measuring assembly, a slight variation in one of these biasing sources would destroy the accuracy of the complete system. It is important to note from FIG. 2 that every component in the measuring system 56 is referenced directly to ground and that no separate bias supplies are provided. Thus, the cost of separate reference sources is eliminated and a reference variation universally affects all components of the measuring assembly equally.

With a load applied to the load cell 12 and a resultant analog signal applied through the amplifier 16 and filter 18 to the detector 20, a control signal from the sequencer 22 is applied to the ramp and gate control unit 24 to initiate operation of the measuring assembly 56. The control signal from the sequencer is received by a gate 62 which passes the control signal to a ramp flip flop unit 64. The ramp flip flop, upon receiving the control signal, changes from a first state to a second state, and provides an enabling signal to a pulse gate 66 and to the base of a transistor 68. The pulse gate has inputs connected to the stable oscillator 36, the detector 34 and the ramp flip flop, and operates to pass pulses to the counter 40 upon receipt of both an enabling signal from the ramp flip flop and a start signal from the detector 34.

Normally, the transistor 68 is cut off, and therefor a positive voltage is applied to one side of a voltage divider consisting of resistors 70 and 72 in the ramp reset unit 30, while an equal negative voltage is applied to the opposite side of the voltage divider. This places a point 74 between the resistors 70 and 72 at a positive potential which locks diodes 76, 78 and 80 connected across the integrator ramp generator 32 in a forward biased condition. Therefore, the charging of integrator capacitors 82 and 84 to form a ramp signal is prevented. The resistors 70 and 72 are designed with relation to the input voltages thereto to provide the desired potential at the point 74. Thus, for example, with a positive and negative 15 volt input to the voltage divider when the transistor 68 is cut off, the resistor 70 could be 15K ohms and resistor 72 a 68K ohm resistor. Other suitable resistance values could be designed by those skilled in the art.

The enabling signal from the ramp flip flop 64 to the base of the transistor 68 switches the transistor into conduction, and the positive signal to the resistor 70 is withdrawn. The voltage potential at the point 74 now drops rapidly until the diodes 76, 78 and 80 are reverse biased, and the integrator ramp generator begins to charge from a negative level to provide a positive going ramp signal.

When the ramp signal from the integrator ramp generator 32 reaches a zero crossing point with the ground reference at the detector 34, a start signal is provided to permit the pulse gate 66 to pass pulses from the oscillator 36 to the counter 40. At a second coincidence point between the ramp and analog signals, the detector 20 provides a stop pulse through a gate 86 to reset the ramp flip flop 64 to the first initial state. This results in the termination of the enabling signal from the ramp flip flop, and the pulse gate 66 blocks the passage of further pulses from the stable oscillator 36, while the transistor 68 ceases conduction.

It is important to note that series resistors 86 and 88 normally maintain a virtual ground at the input to the detector 20, and thus permit summing of the analog and ramp signals at this input while preventing the passage of the analog signal to the input of the detector 34.

With the transistor 68 cut off, the point 74 goes positive and the diode 80 is forward biased to provide a positive potential on the integrator ramp generator to rapidly drive the positive ramp signal down to a negative potential. The capacitors 82 and 84 are rapidly discharged until the diodes 76 and 78 are again forward biased, and the integrator ramp generator is then locked off by the forward biased diodes of the ramp reset unit 30.

Although the above description applies to the operation occurring during one ramp cycle, it will be understood by those skilled in the art that a plurality of ramp cycles would normally be employed for one measurement to increase resolution and stability. The number of ramps provided for each measuring operation is determined by the sequencer 22 which provides the command signal to start each ramp.

We claim:

1. An electronic measuring system for measuring an unknown analog signal comprising electrical transducer means for converting a function to be measured to said unknown analog signal, reference generating means (for generating) operative to receive an input signal and to generate a substantially linerally increasing reference signal which varies in response to variations in said input signal for comparison with said analog signal, comparison means connected to receive said reference and analog signals from said reference generating means and transducer means respectively, said comparison means operating to provide an output signal when said reference signal reaches a coincidence point with said analog signal, and a single electrical power supply means connected to supply the current requirements for said transducer means and to supply the input signal to said reference generating means, said input signal varying with variations in the output from said power supply means and said reference generating means operating in response to said input signal to vary said reference signal in response to variations in the output from said power supply means to compensate for variations in the analog signal from said transducer means resulting from said power supply output variations.

2. The electronic measuring system of claim 1 wherein said power supply means is connected to said transducer means to provide a power supply which is symmetrical about a ground potential for the system.

3. The electronic measuring system of claim 1 wherein said comparison means operates to provide a first output signal when said reference signal reaches a coincidence point with a ground reference potential for said system, said output signal provided by said comparison means when said reference signal reaches a coincidence point with said analog signal constituting a subsequent second output signal from said comparison means.

4. The electronic measuring system of claim 3 wherein said comparison means includes first comparator means connected to receive said reference signal and operating to provide said first output signal when the reference signal reaches a coincidence point with a ground reference potential for said system and second comparator means connected to receive said analog and reference signals, said second comparator means operating to provide a second output signal when said reference signal reaches a coincidence point with said analog signal.

5. The electronic measuring system of claim 4 wherein said analog signal is negative with respect to said ground reference potential and said reference signal increases in a positive direction with respect to said ground reference potential.

6. The electronic measuring system of claim 3 which includes means for providing constant frequency signals, said reference generating means including ramp and gate control means connected to receive said constant frequency signals and the first and second output signals from said comparison means, said ramp and gate control means operating upon receipt of said first output signal to pass constant frequency signals and upon receipt of said second output signal to inhibit said constant frequency signals.

7. The electronic measuring system of claim 6 wherein said ramp and gate control means operates upon receipt of said second output signal to provide a ramp termination signal for said reference generating means, said reference generating means operating upon receipt of said ramp termination signal to rapidly drive said reference signal to the initial potential point thereof.

8. The electronic measuring system of claim 6 which includes first counter means connected to receive and register the constant frequency signals from said ramp and gate control means, tare control means connected to set said first counter means below zero whereby constant frequency signals initially received by said first counter means operate to cause said first counter means to count toward zero, gate means connected to receive said constant frequency signals from said ramp and gate control means, a second counter means connected to said gate means, and sensing means operative to provide a gating signal to said gate means when said first counter means counts to zero, said gate means operating upon receipt of said gating signal to pass subsequent constant frequency signals to said second counter means.

9. The electronic measuring system of claim 3 wherein said linearly increasing reference signal is initiated at a potential point which is of the same sign relative to said ground reference potential as the analog signal at said first comparator means, said reference generating means causing said reference signal to increase through the level of said ground reference potential to a potential opposite to that of said analog signal at said first comparator means.

10. The electronic measuring system of claim 7 which includes sequencing means operative to program said electronic measuring system during an automatic cycle of operation, said sequencing means providing control signals to said ramp and gate control means, said ramp and gate control means operating in response to a control signal from said sequencing means to cause said reference generating means to generate said linearly increasing reference signal.

11. The electronic measuring system of claim 10 wherein said reference generating means includes integrator means operative upon charging to provide said substantially linearly increasing reference signal, and ramp reset means connected between said integrator means and said ramp and gate control means and operative upon receipt of a ramp start signal to initiate charging of said integrator means and upon receipt of said ramp termination signal to drive the charge from said integrator means, said ramp and gate control means operating to provide said ramp start signal to said ramp reset means in response to a control signal from said sequencing means.

12. The electronic measuring system of claim 11 wherein said ramp reset means includes oppositely poled diodes connected across said integrator means and input means connected to said ramp and gate control means and operative in response to a ramp start signal to provide a potential to the oppositely poled diodes to reverse bias said diodes and permit charging of said integrator means, said input means operating in response to a ramp termination signal from said ramp and gate control means to provide a potential to said oppositely poled diodes to forward bias said diodes and drive the charge from said integrator means.

13. The electronic measuring system of claim 12 wherein said ramp reset means includes ramp flip flop means which is switched from an inactive to an active state by the control signal from said sequencing means and back to said inactive state by the second output signal from said comparison means, said ramp flip flop means operating in said active state to provide an enabling output signal, pulse gate means connected to receive said enabling signal, the first output signal from said comparison means and said constant frequency signals, said pulse gate means operating to pass said constant frequency signals in response to the simultaneous reception thereby of said enabling output and first output signals, and switching means connected to receive said enabling output signal from said ramp flip flop means, said switching means operating in the absence of said enabling output signal to provide a first potential to the input means for said ramp reset means and in response to said enabling output signal to provide a second potential to the input means for said ramp reset means.

14. The electronic measuring system of claim 4 wherein said reference generating means and first and second comparator means are referenced to the ground reference potential for said system.

15. The electronic measuring system of claim 2 wherein said reference signal generating means includes integrator means connected to charge from said single electrical power supply to provide said substantially linearly increasing reference signal, the charging time of said integrator means varying in response to variations in said power supply to vary the slope of said reference signal to compensate for the effect of said power supply variations on the analog signal produced by said transducer means.

16. The electronic measuring system of claim 15 wherein said single electrical power supply is connected to provide equal supply voltage inputs to said integrator means, said integrator means and comparison means being referenced to the ground reference potential for said system.

17. The electronic measuring system of claim 16 which includes amplifier means connected between said transducer means and said comparison means to amplify said analog signal, said amplifier means being referenced to said ground reference potential.

18. The electronic measuring system of claim 1 which includes compensation means to vary the output of said transducer means, said compensation means including variable resistance means connected between one input to said transducer means from said power supply and said ground reference.

* * * * *

UNITED STATES PATENT OFFICE
CERTIFICATE OF CORRECTION

Patent No. 3,728,626       Dated  April 17, 1973

Inventor(s) ALEC T. DOUGLAS, ET. AL.

It is certified that error appears in the above-identified patent and that said Letters Patent are hereby corrected as shown below:

Claim 1, line 4, after "means", cancel "(for generating)".

Signed and sealed this 22nd day of January 1974.

(SEAL)
Attest:

EDWARD M. FLETCHER, JR.
Attesting Officer

RENE D. TEGTMEYER
Acting Commissioner of Patents